(12) United States Patent
Imanaka et al.

(10) Patent No.: US 11,313,046 B2
(45) Date of Patent: Apr. 26, 2022

(54) METHOD FOR GENERATING PHOTOCHEMICAL ELECTRODE

(71) Applicant: FUJITSU LIMITED, Kawasaki (JP)

(72) Inventors: Yoshihiko Imanaka, Atsugi (JP); Hideyuki Amada, Atsugi (JP); Toshio Manabe, Atsugi (JP); Toshihisa Anazawa, Sagamihara (JP); Sachio Ido, Yamato (JP); Naoki Awaji, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 230 days.

(21) Appl. No.: 16/597,194

(22) Filed: Oct. 9, 2019

(65) Prior Publication Data
US 2020/0040472 A1 Feb. 6, 2020

Related U.S. Application Data

(62) Division of application No. 15/468,009, filed on Mar. 23, 2017, now abandoned.

(30) Foreign Application Priority Data

Apr. 28, 2016 (JP) .............................. JP2016-091299

(51) Int. Cl.
*C25B 11/051* (2021.01)
*H01G 9/20* (2006.01)
(Continued)

(52) U.S. Cl.
CPC ............ *C25B 11/051* (2021.01); *C23C 24/04* (2013.01); *C25B 1/55* (2021.01); *C25B 11/077* (2021.01); *H01G 9/204* (2013.01); *H01G 9/205* (2013.01)

(58) Field of Classification Search
CPC ....... C23C 24/04; C25B 11/087; C25B 11/091; C25B 11/051
See application file for complete search history.

(56) References Cited

U.S. PATENT DOCUMENTS

2004/0046130 A1* 3/2004 Rao .................. C23C 24/04
250/492.1
2013/0105306 A1 5/2013 Sonoda et al.
(Continued)

FOREIGN PATENT DOCUMENTS

| JP | 2015-200016 A | 11/2015 |
|----|---------------|---------|
| WO | 2013/115213 A1 | 8/2013 |
| WO | 2015/159348 | 10/2015 |

OTHER PUBLICATIONS

Imanaka, Y., Amada, H., Kumasaka, F., Takahashi, N., Yamasaki, T., Ohfuchi, M. and Kaneta, C. (2013), Nanoparticulated Dense and Stress-Free Ceramic Thick Film for Material Integration. Adv. Eng. Mater., 15: 1129-1135. https://doi.org/10.1002/adem.201300174.*

(Continued)

*Primary Examiner* — Alex A Rolland
(74) *Attorney, Agent, or Firm* — Fujitsu Patent Center

(57) ABSTRACT

A photochemical electrode includes: an electrically-conductive layer; and a photo-excited material layer including a photo-excited material provided over the electrically-conductive layer, wherein in a surface of the photo-excited material layer, a lattice plane having highest atomic density in a crystal structure of the photo-excited material is oriented in a surface direction of the surface of the photo-excited material layer.

3 Claims, 2 Drawing Sheets

(51) Int. Cl.
    *C25B 1/55*     (2021.01)
    *C25B 11/077*     (2021.01)
    *C23C 24/04*     (2006.01)

(56) References Cited

U.S. PATENT DOCUMENTS

| | | |
|---|---|---|
| 2015/0132542 A1 | 5/2015 | Sun et al. |
| 2015/0251172 A1* | 9/2015 | Tokudome ............. B01J 21/063 428/323 |
| 2017/0002471 A1 | 1/2017 | Okamoto |

OTHER PUBLICATIONS

Shilei Xie et al., "Enhanced photoactivity and stability of carbon and nitrogen co-treated ZnO nanorod arrays for photoelectrochemical water splitting", Journal of Materials Chemistry, 2012, No. 22, pp. 14272-14275. Cited in JPOA mailed Aug. 18, 2020 for corresponding Japanese Patent Application No. 2016-091299.

JPOA—Japanese Office Action dated Aug. 18, 2020 for corresponding Japanese Patent Application No. 2016-091299 with Machine Translation.
JPOA—Japanese Office Action dated Jun. 9, 2020 for corresponding Japanese Patent Application No. 2016-091299 with Machine Translation.
JPOA—Japanese Office Action dated Jan. 7, 2020 for corresponding Japanese Patent Application No. 2016-091299 with Machine Translation.
USPTO, (Keeling) Final Office Action , dated Jul. 25, 2019, in parent U.S. Appl. No. 15/468,009 [pending].
USPTO, (Keeling) Non-Final Office Action, dated Mar. 7, 2019, in parent U.S. Appl. No. 15/468,009 [pending].
USPTO, (Keeling) Requirement for Restriction/Election, dated Dec. 7, 2018, in parent U.S. Appl. No. 15/468,009 [pending].
Yoshihiko Imanaka et al., "Nanoparticulated Dense and Stress-Free Ceramic Thick Film for Material Integration", Advanced Engineering Materials, 15, No. 11, 2013, pp. 1129-1135 (2003).
Kuykendall et al., "Crystallographic Alignment of High-density Gallium Nitride Nanowire Arrays", Nature Materials, vol. 3, 2004, p. 524-528 (2004).

\* cited by examiner

METHOD FOR GENERATING PHOTOCHEMICAL ELECTRODE

CROSS-REFERENCE TO RELATED APPLICATION

This application is a divisional of application Ser. No. 15/468,009, filed Mar. 23, 2017, which is based upon and claims the benefit of priority of the prior Japanese Patent Application No. 2016-091299, filed on Apr. 28, 2016, the entire contents of which are incorporated herein by reference.

FIELD

The embodiments discussed herein are related to a photochemical electrode and a method for generating a photochemical electrode.

BACKGROUND

Because of global environmental problems and energy problems, clean energy creation techniques without carbon dioxide ($CO_2$) emissions are attracting attention.

A related art is disclosed in Japanese Laid-open Patent Publication No. 2015-200016.

SUMMARY

According to an aspect of the embodiment, a photochemical electrode includes: an electrically-conductive layer; and a photo-excited material layer including a photo-excited material provided over the electrically-conductive layer, wherein in a surface of the photo-excited material layer, a lattice plane having highest atomic density in a crystal structure of the photo-excited material is oriented in a surface direction of the surface of the photo-excited material layer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
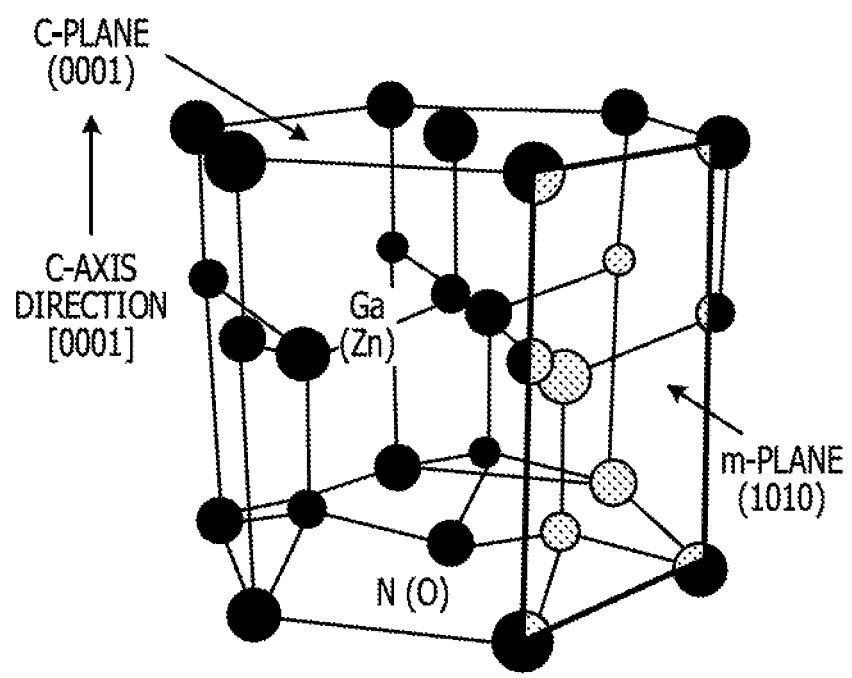
FIG. 1 illustrates one example of a wurtzite crystal structure of a (1−x)GaN-xZnO (gallium nitride-zinc oxide) solid solution.

For example, in an artificial photosynthesis technique included in clean energy creation techniques, by using energy of sunlight, electrons generated from a photosemiconductor material (anode electrode part) are caused to react with protons in water and hydrogen is formed. When $CO_2$ is dissolved in the water, organic compounds serving as a source of energy, such as formic acid, formaldehyde, methane, and methanol, are generated from reaction of the electrons, the protons, and the $CO_2$.

In an artificial photosynthesis system, for example, electrical conduction is made by a conductor between an anode electrode and a cathode electrode set in water. A photocatalytic semiconductor material (semiconductor material that may be excited by visible light and has a small band gap) formed on the anode electrode is irradiated with sunlight and charge-hole separation is carried out, so that excited electrons are transmitted by the conducting line. Thus, protons and the electrons react on the cathode electrode and hydrogen is generated.

For example, in the artificial photosynthesis system, the formed electrons and holes may recombine when the photocatalytic semiconductor material formed on the anode electrode is irradiated with sunlight. For this reason, the amount of charge for use for the hydrogen generation reaction may decrease and a high photocurrent for the hydrogen generation may not be obtained.

The photochemical electrode has at least an electrically-conductive layer and a photo-excited material layer and may further include other members according to need.

The photo-excited material layer contains a photo-excited material. In the surface of the photo-excited material layer, the lattice plane having the highest atomic density in the crystal structure of the photo-excited material is oriented in the surface direction of the surface of the photo-excited material layer.

As described above, in the artificial photosynthesis system, the formed electrons and holes may recombine when the photocatalytic semiconductor material formed on the anode electrode is irradiated with sunlight. For this reason, the amount of charge for use for the hydrogen generation reaction may decrease and a high photocurrent for the hydrogen generation may not be obtained.

For example, in the photo-excited material, charge separation due to photoexcitation may actively occur in the lattice plane having the highest atomic density in the crystal structure. For this reason, a high photocurrent may be obtained by orienting the lattice plane having the highest atomic density in the crystal structure of the photo-excited material in the surface of the photo-excited material layer.

As long as the electrically-conductive layer is a layer including electrical conductivity, the material, shape, size, and structure of the electrically-conductive layer are not particularly limited and may be selected as appropriate according to the purpose. Examples of the material of the electrically-conductive layer include metals, metal oxides, and so forth. Examples of the metals include silver (Ag), gold (Au), copper (Cu), platinum (Pt), palladium (Pd), tungsten (W), nickel (Ni), tantalum (Ta), bismuth (Bi), lead (Pb), indium (In), tin (Sn), zinc (Zn), titanium (Ti), aluminum (Al), and so forth. Examples of the metal oxides include tin-doped indium oxide (ITO), fluorine-doped tin oxide (FTO), antimony-doped tin oxide (ATO), zinc oxide (ZnO), indium oxide ($In_2O_3$), aluminum-doped zinc oxide (AZO), gallium-doped zinc oxide (GZO), tin oxide, zinc oxide-tin oxide series, indium oxide-tin oxide series, zinc oxide-indium oxide-magnesium oxide series, and so forth.

If the electrically-conductive layer is a thin film, the electrically-conductive layer may be supported by a support body. Examples of the support body include a glass plate and so forth.

The photo-excited material layer contains the photo-excited material. In the surface of the photo-excited material layer, the lattice plane having the highest atomic density in the crystal structure of the photo-excited material is oriented in the surface direction of the surface of the photo-excited material layer. The photo-excited material means a material that absorbs light and is excited. The surface of the photo-excited material layer is the surface on the opposite side to the electrically-conductive layer side.

"The lattice plane having the highest atomic density is oriented in the surface direction of the surface of the photo-excited material layer" means that, in the surface of the photo-excited material layer, the lattice plane having the highest atomic density in the crystal structure of the photo-excited material is exposed substantially in parallel to the surface direction of the surface of the photo-excited material layer. The exposure of the lattice plane substantially in parallel to the surface direction of the surface of the photo-excited material layer in the surface of the photo-excited material layer may be confirmed by low-angle annular dark-field scanning transmission electron microscopy (LAADF-STEM) or the like, for example. In the surface of the photo-excited material layer, the lattice surface having the highest atomic density in the crystal structure of the photo-excited material may not need to occupy the whole of the surface. If a diffraction peak by x-ray diffraction (XRD) is different from other diffraction peaks in the relative intensity ratio compared with diffraction peaks of an isotropic material, the surface of the diffraction peak indicating the higher intensity is oriented.

For example, when photo-excited material particles are crushed, the particles readily break along a plane across which the bonding strength between the atoms is weak (cleavage plane). The plane that becomes the cleavage plane may be the lattice plane having the highest atomic density in the crystal structure. When photo-excited material particles are crushed along the cleavage plane, the particles after the crushing have a flattened shape including the cleavage plane in the surface. For this reason, if photo-excited material particles fly while being crushed and are deposited on the electrically-conductive layer to form the photo-excited material layer, in the surface of the formed photo-excited material layer, the cleavage plane, e.g. the lattice plane having the highest atomic density in the crystal structure of the photo-excited material, is exposed substantially in parallel to the surface direction of the surface of the photo-excited material layer. Such a state may be the state in which "the lattice plane having the highest atomic density in the crystal structure of the photo-excited material is oriented in the surface direction of the surface of the photo-excited material layer." Also when photo-excited material particles that are not cleaved are deposited on the electrically-conductive layer and the photo-excited material layer is formed, the lattice plane having the highest atomic density in the crystal structure of the photo-excited material may be exposed substantially in parallel to the surface direction of the surface of the photo-excited material layer in the surface of the photo-excited material layer. However, the degree of exposure in this case may be very low and such a state may not be the state in which "the lattice plane having the highest atomic density in the crystal structure of the photo-excited material is oriented in the surface direction of the surface of the photo-excited material layer."

The photo-excited material is not particularly limited and may be selected as appropriate according to the purpose. Examples of the photo-excited material include oxides, nitrides, carbides, sulfides, III-V group compound semiconductors, II-VI group compound semiconductors, and so forth. One kind of material among these materials may be used alone or two or more kinds of materials may be used in combination.

The photo-excited material may include a wurtzite crystal structure. If the photo-excited material includes a wurtzite crystal structure, the lattice plane (lattice plane having the highest atomic density in the crystal structure of the photo-excited material) is (0001) plane.

Examples of the photo-excited material including a wurtzite crystal structure include GaN, ZnO, BeO, and so forth. The photo-excited material including a wurtzite crystal structure may be a solid solution of MN (M is at least any of Ga, Al, and In) and ZnO. Examples of such a solid solution include gallium nitride-zinc oxide solid solutions, aluminum nitride-zinc oxide solid solutions, indium nitride-zinc oxide solid solutions, and so forth. Note that Ga, Al, and In share a common ground of being a group-13 element.

FIG. 1 illustrates one example of a wurtzite crystal structure of a (1−x)GaN-xZnO solid solution. In FIG. 1, the upward plane is (0001) plane and is the lattice plane having the highest atomic density in the crystal structure of the photo-excited material.

The method for fabricating the photo-excited material layer is not particularly limited and may be selected as appropriate according to the purpose because it suffices that, in the surface of the photo-excited material layer, the lattice plane having the highest atomic density in the crystal structure of the photo-excited material is oriented in the surface direction of the surface of the photo-excited material layer. For example, the photo-excited material layer may be fabricated by an aerosol-type nanoparticle deposition (NPD) method. For example, an aerosol-type nanoparticle deposition (NPD) method described in a literature (ADVANCED ENGINEERING MATERIALS, 2013, 15, No. 11, 1129-1135) may be used. For example, raw material particles are crushed in a nozzle as in a schematic diagram illustrated in FIG. 1(a) of the literature. When the raw material particles are crushed, the particles readily break along a plane across which the bonding strength between the atoms is weak, e.g. the cleavage plane. The cleavage plane is the lattice plane having the highest atomic density in the crystal structure. For example, the photo-excited material layer may be easily fabricated when the method described in the literature (ADVANCED ENGINEERING MATERIALS, 2013, 15, No. 11, 1129-1135) is used.

The degree at which the lattice plane having the highest atomic density in the crystal structure of the photo-excited material is oriented in the surface direction of the surface of the photo-excited material layer in the surface of the photo-excited material layer may be referred to as the degree of orientation. The degree of orientation may be obtained as follows for example.

For the degree of orientation, an X-ray diffraction result is calculated by the March-Dollase (MD) function. The MD function method is a method in which the multiplicity of the orientation direction is multiplied by the weight of an elliptical shape to calculate the intensity in the Rietveld analysis. The degree of orientation is 0% in a random array as in powders, and the degree of orientation becomes higher as particles having a flattened shape increase. For example, the aspect ratio of flattened particles is calculated through peak fitting by the MD function. The orientation percentage (volume percentage) in the aspect ratio is obtained from a curve resulting from integrating the MD function obtained by using the value of the aspect ratio of the flattened particles with respect to the orientation angle. For example, the analysis target may be certified to be "oriented" if the degree of orientation obtained by the above-described method is equal to or higher than 5%.

In the photo-excited material layer, it is preferable that the oxidation-reduction potential of $H^+/H_2$ and the oxidation-reduction potential of $O_2/H_2O$ exist between the upper edge of the valence band and the lower edge of the conduction band in the surface on the opposite side of the surface on the electrically-conducive layer side. Thus, oxidation decomposition of water may be carried out only with a photochemical electrode.

The average thickness of the photo-excited material layer is not particularly limited and may be set as appropriate according to the purpose and may be 0.5 to 5 µm, for example.

Figure 2:
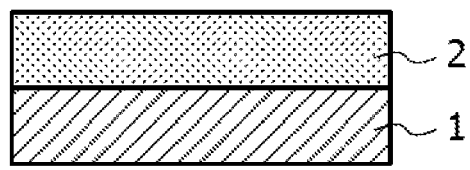
FIG. 2 illustrates one example of a section of a photochemical electrode.

FIG. 2 illustrates one example of a section of a photochemical electrode. The photochemical electrode of FIG. 2 includes an electrically-conductive layer 1 and a photo-excited material layer 2 on the electrically-conductive layer 1. The electrically-conductive layer 1 may be supported by a support body such as a glass substrate.

The photochemical electrode is useful as an anode electrode used as an anode of carbon dioxide reduction apparatus that carries out artificial photosynthesis. The carbon dioxide reduction apparatus includes the photochemical electrode, for example, an anode electrode, a proton permeable membrane, and a cathode electrode and may further include other members according to need.

The following photo-excited materials may be used.

GaN powders: gallium nitride having an average particle size of 500 nm

ZnO powders: zinc oxide having an average particle size of 500 nm $Al_2O_3$ powders: aluminum oxide having an average particle size of 500 nm The following photo-excited material is prepared. The preparation may be carried out by a publicly-known method. In the following photo-excited material, a numeric value in parentheses represents a mole ratio. For example, a GaN(60)-ZnO(40) solid solution is a solid solution in which the mole ratio of GaN and ZnO (GaN:ZnO) is 60:40.

GaN(60)-ZnO(40) solid solution (average particle size is 500 nm)

The GaN(60)-ZnO(40) solid solution is prepared by mixing $Ga_2O_3$ particles and ZnO particles in such a manner that the mole ratio of GaN and ZnO (GaN:ZnO) in the solid solution becomes 60:40 followed by performing heat treatment under a nitrogen atmosphere or an ammonia atmosphere at 700° C. for 30 hours.

As a first example, glass on which an FTO (fluorine-doped tin oxide) thin film is formed is used. The GaN(60)-ZnO(40) solid solution is sprayed onto the FTO thin film by an aerosol-type nanoparticle deposition (NPD) method and a thin film having an average thickness of 1 µm is formed. Subsequently, annealing in a nitrogen atmosphere at 600° C. for 30 minutes is carried out. Through the above, the photochemical electrode is obtained. The aerosol-type nanoparticle deposition (NPD) method may be the method described in the literature (ADVANCED ENGINEERING MATERIALS, 2013, 15, No. 11, 1129-1135).

For the degree of orientation of (0001) plane, an X-ray diffraction result may be calculated by the MD function. The MD function method is a method in which the multiplicity of the orientation direction is multiplied by the weight of an elliptical shape to calculate the intensity in the Rietveld analysis. The degree of orientation is 0% in a random array as in powders, and the degree of orientation becomes higher as particles having a flattened shape increase. The calculation result is represented in Table 1.

The obtained photochemical electrode is immersed in a $Na_2SO_4$ 0.5-mol water-based electrolyte, and an end part is coupled to a metal line and a platinum plate is disposed as the counter electrode. The photochemical electrode is disposed between both electrodes of an external power supply and a current measurement unit (potentiostat). The surface of the photochemical electrode is irradiated with pseudo-sunlight of 1 SUN with 100 mA/$cm^2$ and the current value at this time is measured. The obtained photocurrent value is represented in Table 1.

In a second example, a photochemical electrode is fabricated similarly to the first example except for that the flow rate of the carrier gas in the first example is changed from 100 to 200 m/second. Regarding the fabricated photochemical electrode, the degree of orientation and the photocurrent value are obtained similarly to the first example. The result is represented in Table 1.

In a third example, a photochemical electrode is fabricated similarly to the first example except for that the flow rate of the carrier gas in the first example is changed from 100 to 300 m/second. Regarding the fabricated photochemical electrode, the degree of orientation and the photocurrent value are obtained similarly to the first example. The result is represented in Table 1.

In a fourth example, a photochemical electrode is fabricated similarly to the first example except for that the flow rate of the carrier gas in the first example is changed from 100 to 400 m/second. Regarding the fabricated photochemical electrode, the degree of orientation and the photocurrent value are obtained similarly to the first example. The result is represented in Table 1.

In a fifth example, glass on which a fluorine-doped tin oxide (FTO) thin film is formed is used. A dispersion liquid obtained by dispersing particles of the GaN(60)-ZnO(40) solid solution in water is applied on the FTO thin film by using a squeegee and thereafter the water component is removed, so that a thin film having an average thickness of 1 µm is formed. Subsequently, annealing in a nitrogen atmosphere at 600° C. for 30 minutes is carried out. Through the above, a photochemical electrode is obtained.

Regarding the fabricated photochemical electrode, the degree of orientation and the photocurrent value are obtained similarly to the first example. The result is represented in Table 1.

TABLE 1

| | example 1 | example 2 | example 3 | example 4 | example 5 |
|---|---|---|---|---|---|
| Photo-excited material | GaN(60)—ZnO(40) solid solution | | | | |
| Degree of orientation (%) | 5 | 10 | 20 | 35 | 0 |
| Photocurrent (mA/$cm^2$) | 0.1 | 0.2 | 0.5 | 0.8 | 0.005 |

In a sixth example, a photochemical electrode is fabricated similarly to the second example except for that the GaN(60)-ZnO(40) solid solution in the second example is replaced by GaN powders.

Regarding the fabricated photochemical electrode, the degree of orientation and the photocurrent value are obtained similarly to the first example. The result is represented in Table 2.

In a seventh example, a photochemical electrode is fabricated similarly to the second example except for that the GaN(60)-ZnO(40) solid solution in the second example is replaced by ZnO powders.

Regarding the fabricated photochemical electrode, the degree of orientation and the photocurrent value are obtained similarly to the first example. The result is represented in Table 2.

In a eighth example, a photochemical electrode is fabricated similarly to the second example except for that the GaN(60)-ZnO(40) solid solution in the second example is replaced by $Al_2O_3$ powders.

Regarding the fabricated photochemical electrode, the degree of orientation and the photocurrent value are obtained similarly to the first example. The result is represented in Table 2.

In an ninth example, a photochemical electrode is fabricated similarly to the first example except for that the GaN(60)-ZnO(40) solid solution in the first example is replaced by GaN powders.

Regarding the fabricated photochemical electrode, the degree of orientation and the photocurrent value are obtained similarly to the first example. The result is represented in Table 2.

In a tenth example, a photochemical electrode is fabricated similarly to the first example except for that the GaN(60)-ZnO(40) solid solution in the first example is replaced by ZnO powders.

Regarding the fabricated photochemical electrode, the degree of orientation and the photocurrent value are obtained similarly to the first example. The result is represented in Table 2.

In a eleventh example, a photochemical electrode is fabricated similarly to the first example except for that the GaN(60)-ZnO(40) solid solution in the first example is replaced by $Al_2O_3$ powders.

Regarding the fabricated photochemical electrode, the degree of orientation and the photocurrent value are obtained similarly to the first example. The result is represented in Table 2.

TABLE 2

| | example 6 | example 7 | example 8 | example 9 | example 10 | example 11 |
|---|---|---|---|---|---|---|
| Photo-excited material | GaN | ZnO | $Al_2O_3$ | GaN | ZnO | $Al_2O_3$ |
| Degree of orientation (%) | 10 | 10 | 10 | 0 | 0 | 0 |
| Photocurrent (mA/cm$^2$) | 0.05 | 0.1 | 0.05 | 0.002 | 0.003 | 0.001 |

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for generating a photochemical electrode, the method comprising:

preparing an electrically-conductive layer that contains a metal or a metal oxide;

spraying, by an aerosol-type nanoparticle deposition (NPD) method, a photo-excited material including a wurtzite crystal structure onto the electrically-conductive layer in such a manner that raw material particles of the photo-excited material are crushed in a nozzle and a lattice plane (0001) having the highest atomic density is cleaved to form a photo-excited material layer having a first surface which faces the electrically-conductive layer and a second surface opposite to the first surface; and annealing the electrically-conductive layer and the photo-excited material layer in a gas atmosphere, wherein the lattice plane (0001) is oriented in a surface direction of the second surface and is exposed.

2. The method for generating the photochemical electrode according to claim 1, wherein the photo-excited material is a gallium nitride-zinc oxide solid solution.

3. The method for generating the photochemical electrode according to claim 1, wherein the spraying is carried out to form the photo-excited material layer having an average thickness of 1 μm and the electrically-conductive layer and the photo-excited material layer is annealed in a nitrogen atmosphere at 600°.

* * * * *